(12) United States Patent
Candelore et al.

(10) Patent No.: US 7,839,998 B2
(45) Date of Patent: Nov. 23, 2010

(54) TRANSCODING CABLECARD

(75) Inventors: Brant L. Candelore, Escondido, CA (US); Henry Derovanessian, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1133 days.

(21) Appl. No.: 10/774,870

(22) Filed: Feb. 9, 2004

(65) Prior Publication Data

US 2005/0175178 A1 Aug. 11, 2005

(51) Int. Cl.
*H04K 1/00* (2006.01)
*H04N 7/167* (2006.01)
*H04L 29/06* (2006.01)
*G06F 12/14* (2006.01)
*G06F 17/30* (2006.01)

(52) U.S. Cl. .................. 380/28; 380/201; 380/205; 380/212; 380/217; 380/231; 380/233; 380/236; 380/239; 380/242; 380/255; 713/150; 713/153; 713/165; 713/189; 726/2

(58) Field of Classification Search ............ 380/28, 380/201, 205, 212, 217, 231, 233, 236, 239, 380/242, 255; 713/150, 153, 165, 189; 726/2
See application file for complete search history.

(56) References Cited

U.S. PATENT DOCUMENTS

| | | | |
|---|---|---|---|
| 6,404,814 B1 | 6/2002 | Apostolopoulos et al. | |
| 6,618,442 B1 | 9/2003 | Chen et al. | |
| 6,678,737 B1 | 1/2004 | Bucher | |
| 6,950,463 B2 | 9/2005 | Moni et al. | |
| 7,047,305 B1* | 5/2006 | Brooks et al. | 709/231 |
| 7,250,987 B2* | 7/2007 | Goyal et al. | 348/725 |
| 7,376,829 B2* | 5/2008 | Ranjan | 713/153 |
| 2002/0001343 A1 | 1/2002 | Challapali et al. | |
| 2003/0059047 A1 | 3/2003 | Iwamura | |
| 2003/0126608 A1* | 7/2003 | Safadi et al. | 725/89 |
| 2003/0215011 A1 | 11/2003 | Wang et al. | |
| 2004/0136352 A1* | 7/2004 | Fu et al. | 370/341 |
| 2005/0097361 A1* | 5/2005 | Apostolopoulos et al. | 713/201 |
| 2006/0242325 A1* | 10/2006 | Ramaswamy et al. | 709/246 |

OTHER PUBLICATIONS

OpenCable™ Multi-Stream CableCARD Interface Specification, OC-SP-MC-IF-I01-030905, Cable Labs, Sep. 5, 2003.

(Continued)

*Primary Examiner*—Aravind K Moorthy
(74) *Attorney, Agent, or Firm*—Miller Patent Services; Jerry A. Miller

(57) ABSTRACT

A CableCARD device for manipulation of a stream of data has an inband data input for receiving a stream of video data from a host, the stream of video data being encrypted and encoded according to a first coding. A decrypter decrypts the encrypted data. A transcoder transcodes the stream of video data to convert the stream of video data to a second coding, producing a transcoded data stream. An encrypter encrypts the transcoded data stream. An inband data output sends the encrypted transcoded data stream back to the host. This abstract should not be considered limiting, since other embodiments may incorporate more, fewer or different elements that those described in this abstract.

12 Claims, 3 Drawing Sheets

OTHER PUBLICATIONS

International Search Report and Written Opinion, PCT/US05/00887, Jul. 7, 2008.

"Rate Adaptation Transcoding for Precoded Video Streams," pp. 127-136, ACM, 2002.

"Impact of Video Encoding Parameters on Dynamic Video Transcoding," pp. 1-9, IEEE, 2006.

First Office Action, Chinese Patent Application No. 200580004243.1 (corresponding to U.S. Appl. No. 10/774,870), Issued Nov. 27, 2009; Received Dec. 22, 2009.

* cited by examiner

TRANSCODING CABLECARD

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

As a result of the OpenCable™ initiative, in the near future there may be millions of retail televisions and television set-top boxes (STB) which will only allow for decoding of MPEG 2 (Moving Pictures Expert Group) compliant content. The existence of such a large installed base of "legacy" devices will make it difficult for service providers to provide content in other formats, for example, for the purpose of using more bandwidth efficient codecs, since changes to the data format could in effect "orphan" the existing installed base. Moreover, any migration to a new format and technical advantages associated therewith may be foreclosed.

BRIEF DESCRIPTION OF THE DRAWINGS

Certain exemplary embodiments may be best understood by reference to the following detailed description taken in conjunction with the accompanying drawings in which.

DEFINITIONS

Figure 1:
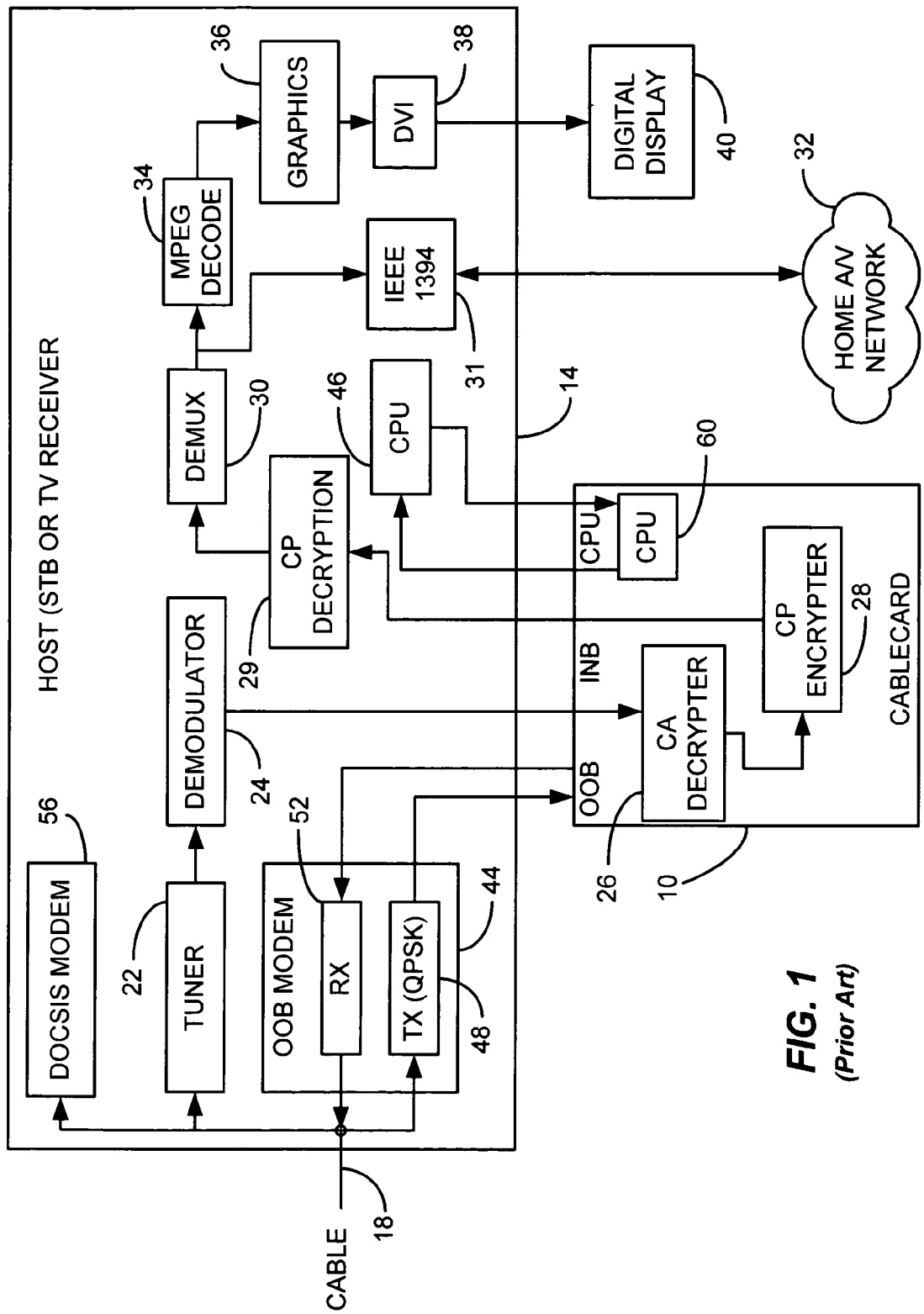
FIG. 1 is a block diagram of a host device such as a television set top box and associated CableCARD.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The terms "scramble" and "encrypt" and variations thereof may be used synonymously herein. Also, the term "television program" and similar terms can be interpreted in the normal conversational sense, as well as a meaning wherein the term means any segment of A/V content that can be displayed on a television set or similar monitor device. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments disclosed herein can be decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself. The term "CableCARD" as used herein is intended to mean a device which functions in the manner of a CableCARD or POD (Point of Deployment Module) as described, without regard for whether or not the device is used in a cable television system.

DETAILED DESCRIPTION

There is shown in the drawings and will herein be described in detail specific embodiments, with the understanding that the present disclosure is to be considered as exemplary and is not intended to limit the invention to the specific embodiments shown and described. In the description below, like reference numerals are used to describe the same, similar or corresponding parts in the several views of the drawings.

The OpenCable™ specification defines a Point of Deployment Module (POD or CableCARD) used in conjunction with a host television Set-Top Box or other television receiver as depicted in FIG. 1. As shown, the CableCARD 10 is interfaced with the host device 14 (e.g., a television or television STB) at a CableCARD (or POD) interface. The cable television network cable 18 is used as a transmission medium to send content to and data to and from the host device 14. Content is supplied as a stream of modulated data (e.g., a modulated multiplexed MPEG 2 data stream) to a tuner 22 that selects a particular channel of incoming content. The tuned content is provided to a demodulator 24 which is then provided to the inband (INB) data port of the CableCARD 10. The demodulated data are supplied to a Conditional Access (CA) decrypter device 26. After processing within the CableCARD, the data stream is re-encrypted by a CP (Copy Protection) encrypter 28 is returned to the host 14. The encrypted data are first decrypted at CP decrypter 29 and then supplied to demultiplexer 30 of host 14, which separates the multiplexed data stream into an MPEG compliant A/V signal. The demultiplexed data can then be supplied to an interface such as an IEEE 1394 interface 31 so that it can be distributed over a home A/V network as shown. The demultiplexed data from demultiplexer 30 are also provided to an MPEG decoder 34 that decodes the MPEG data and presents it to a graphics circuit 36 which in turn presents the data to a digital video interface (DVI) 38 for display on a digital display 40.

Out Of Band data (OOB) can also be communicated via cable 18 using OOB modem 44 which, for example, may have a QPSK (Quadrature Phase Shift Keying) transmitter 38 and receiver 52. CableCARD 10 can also send an receive commands and information using CPU 60 which communicates with CPU 46 of host 14 via the CPU port of the CableCARD 10. Data can also be communicated using a DOCSIS compliant modem 56.

Unfortunately, the system described in connection with FIG. 1 is only able to process video data using a single digital compression protocol such as MPEG 2. If video data are to be transmitted in any other protocol, the host/CableCARD combination is unable to receive and decode the video without substantial modification.

For example, service providers may wish to change the way content encoding is done for a number of reasons. For example, a new encoding scheme may provide for more efficient compression so that an image or sound can be represented with fewer bits to produce comparable quality. This would permit the service provider to provide more content over a limited bandwidth and allow for increased revenues to the service provider. Or, in another example, a new encoding scheme might allow for enhanced intelligence with regard to what is in the content being delivered—for example, objects in the content might be identifiable, or meta-data might provide additional information about an object (e.g., a batter in a baseball game—the user might be able to obtain statistics associated with the batter). Or, in yet another example, the encoding and decoding scheme might allow for better image or sound quality with the same bandwidth. Any number of other coding modifications could evolve which might prove difficult or financially challenging to implement with the scheme shown in FIG. 1.

At this time, it is difficult for a service provider to try or to implement new encoding/decoding schemes because of the existence of the installed base of legacy decoders. New encoding schemes such as MPEG 4, AVC, and Wavelet compression cannot be used without making the existing decoders obsolete.

Figure 2:
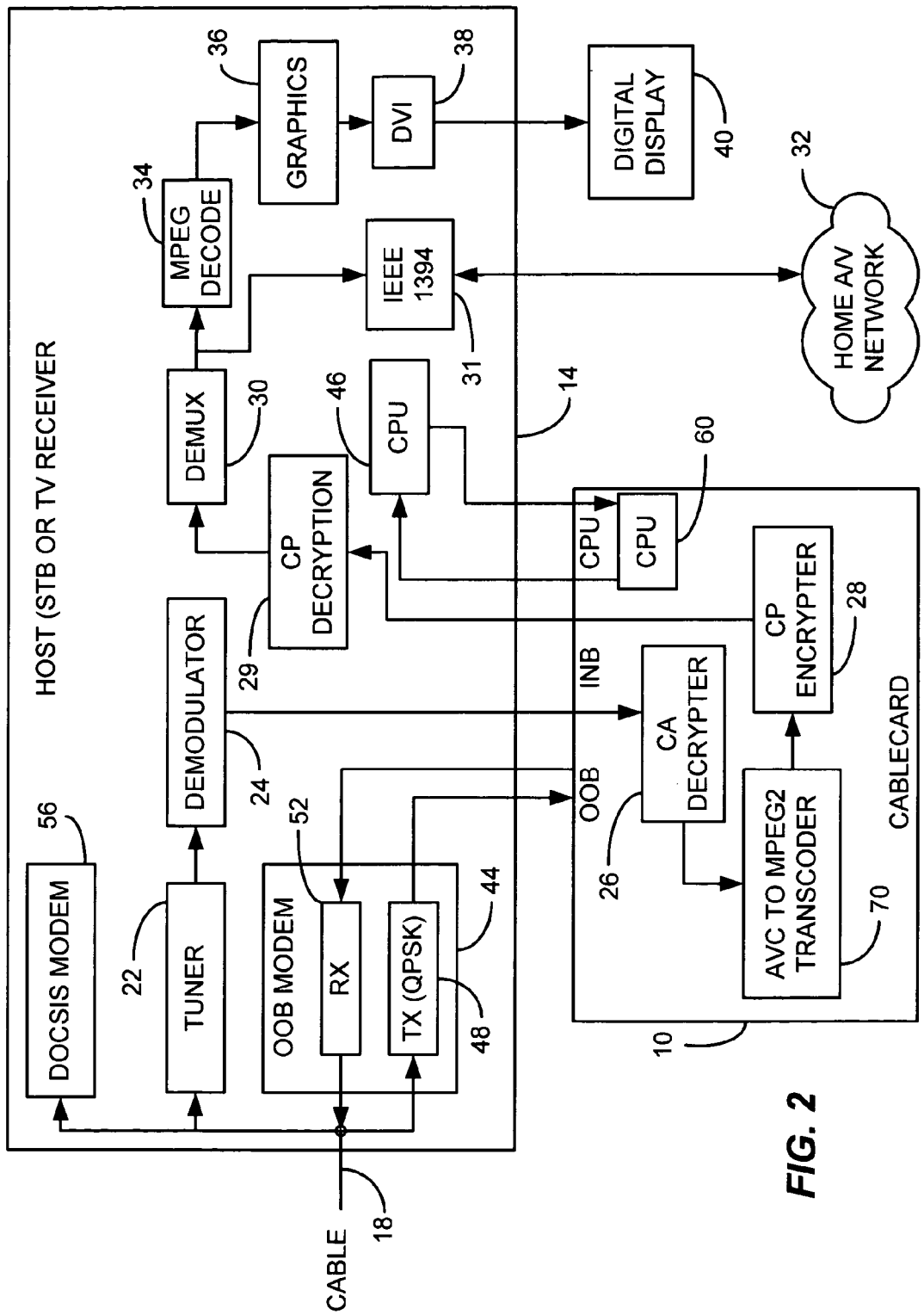
FIG. 2 is a block diagram depicting a transcoding CableCARD consistent with certain embodiments of the present invention.

Referring now to FIG. 2, an embodiment which addresses this issue in a manner that preserves the investment in the host device is presented. In this embodiment, by way of example and not limitation, video data can be provided in AVC format (or any other video format) rather than MPEG 2 as described above, without modification to the host device 14. In this example, functional blocks of like reference number function in a substantially similar manner. AVC format video data (or video data in any other suitable format) are received at tuner 22 from cable 18 and demodulated at demodulator 24. The demodulated AVC data are provided to the CA decrypter 26, as described previously, and decrypted. The decrypted AVC data are supplied to a transcoder device (which may be a hardware device or a software or firmware based device running as a process on a programmed processor such as CPU 60) 70. In this exemplary embodiment, the transcoder device 70 is designated as an AVC to MPEG 2 transcoder, but may be any other suitable transcoder to accommodate incoming data of a format other than AVC and produce an output of a format other than MPEG 2. The transcoded data output from transcoder 70 is in the form of MPEG 2 data which is then supplied to CP encrypter 28 for return to the host 14. In this manner, the video data from the CableCARD 10 produces output that is compatible with the MPEG decoder 34 present in the host device 14 without need for modification of the host device. In certain preferred embodiments, CableCARD 10 is designed and configured to comply with the OpenCable™ specification for Point of Deployment modules (Cable-CARDs).

In a variation of the above, a module similar in design to CableCARD 10 can be used exclusively for transcoding from one coding scheme to another. This can be accomplished with or without the encryption and decryption functions shown.

Thus, in one embodiment, a CableCARD device for manipulation of a stream of data has an inband input for receiving a stream of video data from a host, the stream of video data being encoded according to a first coding. A transcoder transcodes the stream of video data to convert the stream of video data to a second coding. An inband output sends the transcoded video data back to the host. Any suitable hardware, software, firmware or other transcoding method and/or apparatus known or to be developed in the future can be utilized to accomplish the transcoding function without limitation.

In another embodiment, a CableCARD device for manipulation of a stream of data has an inband data input for receiving a stream of video data from a host, the stream of video data being encrypted and encoded according to a first coding. A decrypter decrypts the encrypted data. A transcoder transcodes the stream of video data to convert the stream of video data to a second coding, producing a transcoded data stream. An encrypter then encrypts the transcoded data stream. An inband data output sends the encrypted transcoded data stream back to the host.

Figure 3:
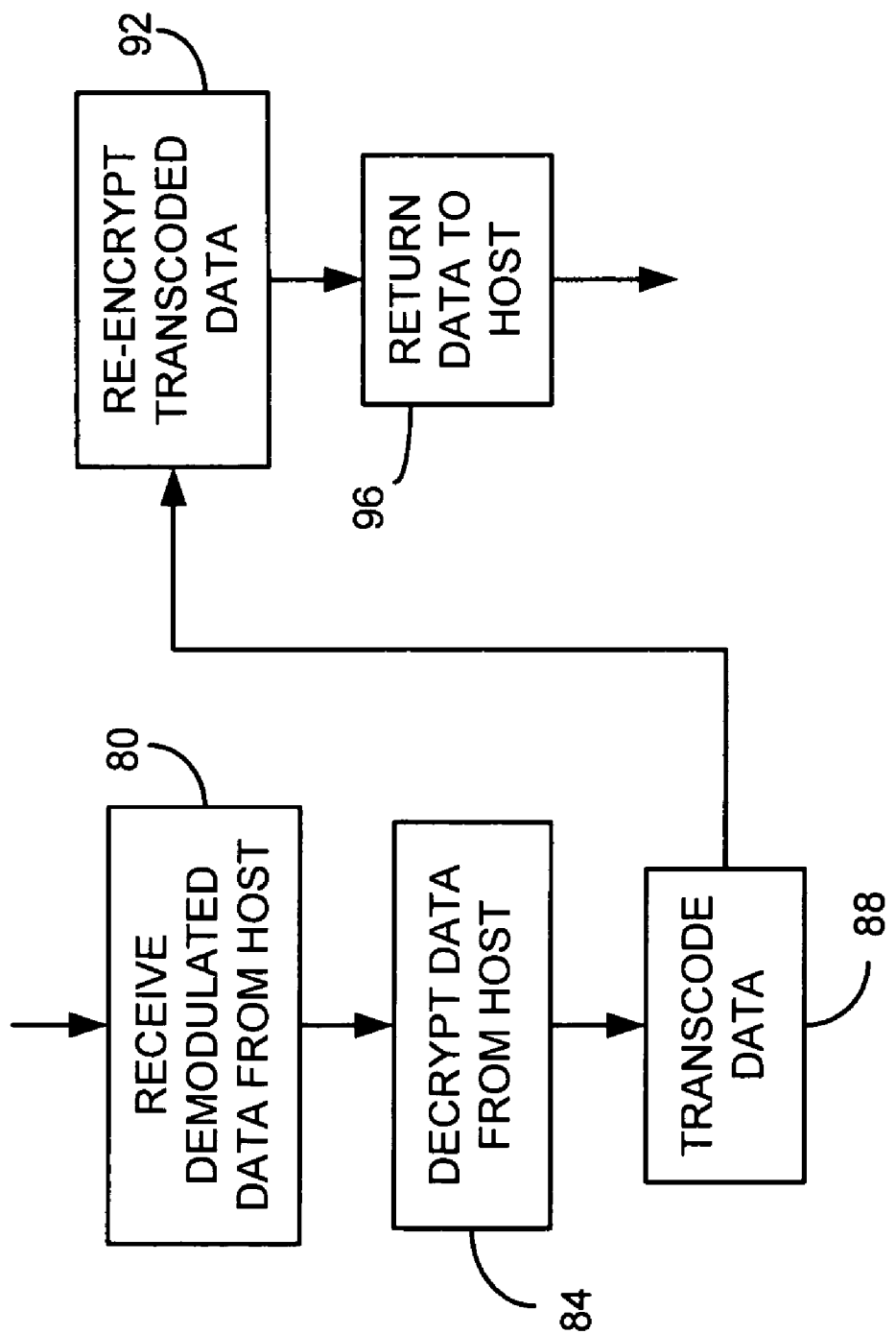
FIG. 3 is a flow chart of one embodiment of a process consistent with the present invention.

FIG. 3 describes the basic process used by CableCARD 10 in the exemplary embodiment described above. Demodulated data are received from the host device 14 at 80 and is decrypted at 84. The decryption process can incorporate various Conditional Access functions that are used to regulate access to the content. The decrypted data are transcoded at 88. In the exemplary embodiment, the data are transcoded from AVC data to MPEG 2 data, but this should not be considered limiting. The transcoded data are then encrypted at 92 for copy protection and returned to the host device 14 at 96. Many variations of this process will be apparent to those skilled in the art upon consideration of the present teaching.

Thus, a method of manipulating a stream of video data in a CableCARD device involves receiving a stream of video data from a host, the stream of video data being encoded according to a first coding; transcoding the stream of video data to convert the stream of video data to a second coding; and sending the transcoded data stream back to the host.

In certain embodiments the stream of data includes encrypted data. The method may further involve decrypting the encrypted data and then copy protecting the data by encrypting the decrypted data. The second coding can be MPEG compliant coding and the CableCARD can be an OpenCable™ compliant CableCARD.

The second coding can be, for example, MPEG 2 compliant coding, and the first coding can be any other coding, such as for example, MPEG 4 compliant coding, MPEG 7 compliant coding, Wavelet compression coding, or AVC coding.

In another embodiment, a method of manipulating a stream of video data in a CableCARD device involves, receiving a stream of video data from a host, the stream of video data being encrypted and encoded according to a first coding; decrypting the encrypted data; transcoding the stream of video data to convert the stream of video data to a second coding, thus producing a transcoded data stream; encrypting the transcoded data stream; and sending the encrypted transcoded data stream back to the host.

Those skilled in the art will recognize that the certain embodiments can be implemented using a programmed processor, e.g., to implement transcoder 70. However, other embodiments could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments.

Those skilled in the art will appreciate that the program steps and associated data used to implement the embodiments described above can be implemented using disc storage as well as other forms of computer readable storage devices such as for example Read Only Memory (ROM) devices, Random Access Memory (RAM) devices; optical storage elements, magnetic storage elements, magneto-optical storage elements, flash memory, core memory and/or other equivalent storage technologies. Such alternative storage devices should be considered equivalents.

Certain embodiments described herein are implemented using a programmed processor executing programming instructions that are broadly described above in flow chart form that can be stored on any suitable computer readable storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While specific embodiments have been described, it is evident that many alternatives, modifications, permutations and variations will become apparent to those skilled in the art in light of the foregoing description.

What is claimed is:

1. A method of manipulating a stream of video data in a point of deployment module device, comprising:
at the point of deployment (POD) module device co-located with and installed within a POD module interface of a retail host television receiver device:
receiving a stream of video data from the host television receiver device, the stream of video data being received by said host television receiver device from a multimedia broadcaster and being encoded according to a first coding, and wherein the stream of video data includes encrypted data;
decrypting the encrypted data at the point of deployment module;
at the POD module, transcoding the stream of video data received from the host television receiver device to convert the stream of video data to a second coding, producing a transcoded data stream;
encrypting the transcoded data stream at the point of deployment module; and
sending the transcoded data stream back to the host television receiver device from the POD module.

2. The method according to claim 1, wherein the second coding comprises MPEG compliant coding.

3. The method according to claim 1, wherein the point of deployment module comprises a point of deployment module compliant with an OpenCable™ standard format.

4. The method according to claim 1, wherein the second coding comprises MPEG 2 compliant coding, and wherein the first coding comprises one of MPEG 4 compliant coding, MPEG 7 compliant coding, Wavelet compression coding, and AVC coding.

5. A point of deployment module device for manipulation of a stream of data, comprising:
means forming a part of the point of deployment (POD) module device co-located with and installed within a POD module interface of a host retail television receiver device for receiving a stream of video data from the host television receiver device, the stream of video data being received by said host television receiver device from a multimedia broadcaster and being encoded according to a first coding and including encrypted data;
a decrypter forming a part of the POD module that decrypts the encrypted data;
a transcoder forming a part of the point of deployment module device that transcodes the stream of video data received from the host television receiver device to convert the stream of video data to a second coding, producing a transcoded data stream;
an encrypter forming a part of the POD module that encrypts the transcoded data stream; and
means forming a part of the point of deployment module device for sending the encrypted transcoded data stream back to the host television receiver device.

6. The point of deployment module device according to claim 5, wherein the second coding comprises MPEG compliant coding.

7. The point of deployment module device according to claim 5, wherein the CableCARD comprises a point of deployment module compliant with an OpenCable™ standard format.

8. The point of deployment module device according to claim 5, wherein the second coding comprises MPEG 2 compliant coding, and wherein the first coding comprises one of MPEG 4 compliant coding, MPEG 7 compliant coding, Wavelet compression coding, and AVC coding.

9. A point of deployment module device for manipulation of a stream of data, comprising:
means forming a part of the point of deployment module (POD) device co-located with and installed within a POD module interface of a retail host television receiver device for receiving a stream of video data, comprising encrypted data, from the host television receiver device, the stream of video data being received by said host television receiver device from a multimedia broadcaster and being encoded according to a first coding;
a decrypter forming a part of the point of deployment module device that decrypts the encrypted data;
a transcoder forming a part of the point of deployment module device that transcodes the stream of video data received from the host television receiver device to convert the stream of video data to a second coding, producing a transcoded data stream;
an encrypter forming a part of the point of deployment module device that encrypts the transcoded data stream; and
means forming a part of the point of deployment module device for sending the encrypted transcoded data stream back to the host television receiver device.

10. The method according to claim 9, wherein the second coding comprises MPEG compliant coding.

11. The method according to claim 9, wherein the point of deployment module device comprises a point of deployment module compliant with an OpenCable™ standard format.

12. The method according to claim 9, wherein the second coding comprises MPEG 2 compliant coding, and wherein the first coding comprises one of MPEG 4 compliant coding, MPEG 7 compliant coding, Wavelet compression coding, and AVC coding.

* * * * *